(12) United States Patent
Gasso Puchal et al.

(10) Patent No.: US 9,315,037 B2
(45) Date of Patent: Apr. 19, 2016

(54) INK AEROSOL FILTRATION (71) Applicant: Hewlett-Packard Development Company, L.P., Houston, TX (US)

(72) Inventors: Xavier Gasso Puchal, Sant Cugat del Valles (ES); Francesc Tarrida Tirado, Sant Cugat del Valles (ES); Xavier Gros Gras, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/435,951

(22) PCT Filed: Oct. 30, 2012

(86) PCT No.: PCT/US2012/062562
§ 371 (c)(1),
(2) Date: Apr. 15, 2015

(87) PCT Pub. No.: WO2014/070140
PCT Pub. Date: May 8, 2014

(65) Prior Publication Data
US 2015/0266305 A1    Sep. 24, 2015

(51) Int. Cl.
*B41J 2/175* (2006.01)
*B01D 46/44* (2006.01)
*B01D 46/00* (2006.01)
*B41J 2/17* (2006.01)

(52) U.S. Cl.
CPC ......... *B41J 2/17563* (2013.01); *B01D 46/0041* (2013.01); *B01D 46/446* (2013.01); *B41J 2/1714* (2013.01)

(58) Field of Classification Search
CPC ..... B41J 2/17563; B01D 46/446; B01D 46/0041
USPC .......................................... 347/34, 83–86, 93
See application file for complete search history.

(56) References Cited

U.S. PATENT DOCUMENTS 3,983,801 A    10/1976   Watanabe et al.
4,077,040 A    2/1978    Hendriks
4,369,450 A    1/1983    Iwagami et al.
(Continued)

FOREIGN PATENT DOCUMENTS

EP    0916509    5/1999
EP    1798034    6/2007
(Continued)

OTHER PUBLICATIONS

The International Search Report for International Application No. PCT/US01/13761 mailed Aug. 11, 2001, 3 pgs.
(Continued)

*Primary Examiner* — Manish S Shah
*Assistant Examiner* — Roger W Pisha, II
(74) *Attorney, Agent, or Firm* — Dicke Billig & Czaja PLLC (57) ABSTRACT An ink aerosol filtration system includes an inlet, a filtration chamber communicated with the inlet and including at least one filter member, and an airflow source communicated with the filtration chamber to generate flow into the inlet, through the filtration chamber and through the at least one filter member, wherein the airflow source is controlled to maintain substantially constant pressure at the inlet.

14 Claims, 5 Drawing Sheets

(56) References Cited

U.S. PATENT DOCUMENTS

| | | |
|---|---|---|
| 4,411,706 A | 10/1983 | Wallace et al. |
| 4,520,366 A | 5/1985 | Cragin, Jr. |
| 4,591,869 A | 5/1986 | Katerberg et al. |
| 4,734,717 A | 3/1988 | Rayfield |
| 4,942,409 A | 7/1990 | Paton et al. |
| 5,528,271 A | 6/1996 | Ebisawa |
| 5,548,894 A | 8/1996 | Muto |
| 5,625,398 A | 4/1997 | Milkovits et al. |
| 5,771,050 A | 6/1998 | Gielen |
| 5,774,141 A | 6/1998 | Cooper et al. |
| 5,798,774 A | 8/1998 | Okada et al. |
| 5,877,788 A | 3/1999 | Haan et al. |
| 6,203,152 B1 | 3/2001 | Boleda et al. |
| 6,220,693 B1 | 4/2001 | Bode et al. |
| 6,270,019 B1 | 8/2001 | Reighard |
| 6,318,854 B1 | 11/2001 | Rasmussen et al. |
| 6,340,225 B1 | 1/2002 | Szlucha |
| 6,367,906 B1 | 4/2002 | Hiramatsu et al. |
| 6,491,364 B2 | 12/2002 | Pietrzyk et al. |
| 6,719,398 B1 | 4/2004 | McElfresh et al. |
| 6,832,829 B2 | 12/2004 | Droege et al. |
| 6,997,538 B1 | 2/2006 | Kawamura et al. |
| 7,452,053 B2 | 11/2008 | Valles et al. |
| 2004/0061738 A1 | 4/2004 | Unosawa et al. |
| 2006/0055730 A1 | 3/2006 | Ono et al. |
| 2008/0143781 A1* | 6/2008 | Inoue .................... B41J 2/1714 347/34 |
| 2009/0251507 A1 | 10/2009 | Lai et al. |
| 2011/0069115 A1 | 3/2011 | Tanabe et al. |
| 2011/0109693 A1* | 5/2011 | Ohnishi .................... B41J 2/18 347/34 |
| 2011/0181658 A1* | 7/2011 | Izawa .................... B41J 2/155 347/34 |

FOREIGN PATENT DOCUMENTS

| | | |
|---|---|---|
| JP | 57093164 | 6/1982 |
| JP | 58104758 | 6/1983 |
| JP | 02063844 | 3/1990 |
| JP | 10000765 | 1/1998 |
| JP | 11001001 | 1/1999 |
| JP | 11198413 | 7/1999 |
| WO | WO-0043209 | 7/2000 |

OTHER PUBLICATIONS

The International Search Report for International Application No. PCT/US01/15472 mailed Aug. 11, 2001, 3 pgs.

PCT Search Report and Written Opinion for Application No. PCT/US12/62562, Apr. 25, 2013, 11 pgs.

Vadillo, D.C. et al., "Evaluation of the Inkjet Fluid's Performance Using the "Cambridge Trimaster" Filament Stretch and Break-Up Device", 2010, 2 pgs., vol. 54; Issue: 2.

* cited by examiner

INK AEROSOL FILTRATION

BACKGROUND

An inkjet printing system may include a printhead, an ink supply which supplies ink to the printhead, and an electronic controller which controls the printhead. The printhead ejects drops of ink through a plurality of nozzles or orifices and toward a print medium, such as a sheet of paper, so as to print onto the print medium. Typically, the orifices are arranged in one or more columns or arrays such that properly sequenced ejection of ink from the orifices causes characters or other images to be printed upon the print medium as the printhead and the print medium are moved relative to each other.

During operation of the inkjet printing system, a mist or fog of suspended ink particles, often referred to as "ink aerosol", may be created. Unfortunately, ink aerosol can cause image-quality defects and print artifacts on the media, and/or may build up within the printing system and cause printer malfunction.

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
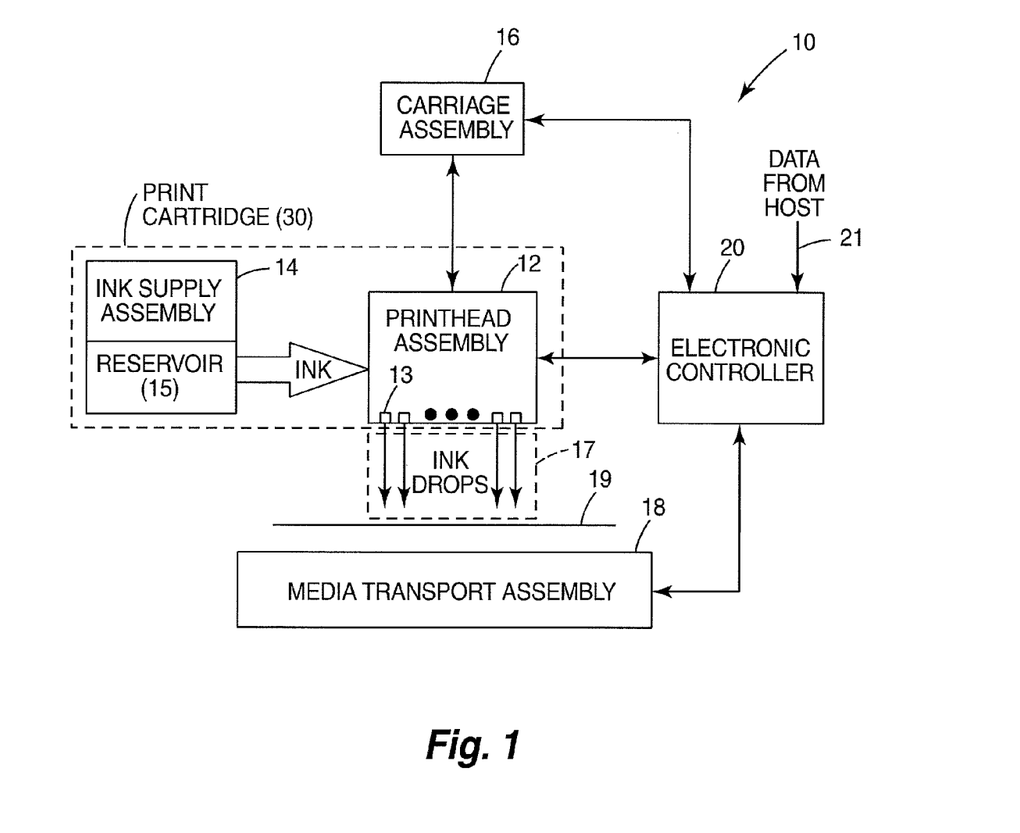
FIG. 1 is a block diagram illustrating one example of an inkjet printing system.

FIG. 1 illustrates one example of an inkjet printing system 10. Inkjet printing system 10 includes a fluid ejection assembly, such as printhead assembly 12, and a fluid supply assembly, such as ink supply assembly 14. In the illustrated example, inkjet printing system 10 also includes a carriage assembly 16, a media transport assembly 18, and an electronic controller 20.

Printhead assembly 12 includes one or more printheads or fluid ejection devices which eject drops of ink or fluid through a plurality of orifices or nozzles 13. In one example, the drops are directed toward a medium, such as print media 19, so as to print onto print media 19. Print media 19 includes any type of suitable sheet material, such as paper, card stock, transparencies, Mylar, fabric, and the like. Typically, nozzles 13 are arranged in one or more columns or arrays such that properly sequenced ejection of ink from nozzles 13 causes characters, symbols, and/or other graphics or images to be printed upon print media 19 as printhead assembly 12 and print media 19 are moved relative to each other.

Ink supply assembly 14 supplies ink to printhead assembly 12 and includes a reservoir 15 for storing ink. As such, in one example, ink flows from reservoir 15 to printhead assembly 12. In one example, printhead assembly 12 and ink supply assembly 14 are housed together in an inkjet or fluid-jet print cartridge or pen, as identified by dashed line 30. In another example, ink supply assembly 14 is separate from printhead assembly 12 and supplies ink to printhead assembly 12 through an interface connection, such as a supply tube.

Carriage assembly 16 positions printhead assembly 12 relative to media transport assembly 18 and media transport assembly 18 positions print media 19 relative to printhead assembly 12. Thus, a print zone 17 is defined adjacent to nozzles 13 in an area between printhead assembly 12 and print media 19. In one example, printhead assembly 12 is a scanning type printhead assembly such that carriage assembly 16 moves printhead assembly 12 relative to media transport assembly 18. In another example, printhead assembly 12 is a non-scanning type printhead assembly such that carriage assembly 16 fixes printhead assembly 12 at a prescribed position relative to media transport assembly 18.

Electronic controller 20 communicates with printhead assembly 12, carriage assembly 16, and media transport assembly 18. Thus, in one example, when printhead assembly 12 is mounted in carriage assembly 16, electronic controller 20 and printhead assembly 12 communicate via carriage assembly 16.

Electronic controller 20 receives data 21 from a host system, such as a computer, and may include memory for temporarily storing data 21. Data 21 may be sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one example, electronic controller 20 provides control of printhead assembly 12 including timing control for ejection of ink drops from nozzles 13. As such, electronic controller 20 defines a pattern of ejected ink drops which form characters, symbols, and/or other graphics or images on print media 19. Timing control and, therefore, the pattern of ejected ink drops, is determined by the print job commands and/or command parameters. In one example, logic and drive circuitry forming a portion of electronic controller 20 is located on printhead assembly 12. In another example, logic and drive circuitry forming a portion of electronic controller 20 is located off printhead assembly 12.

Figure 2:
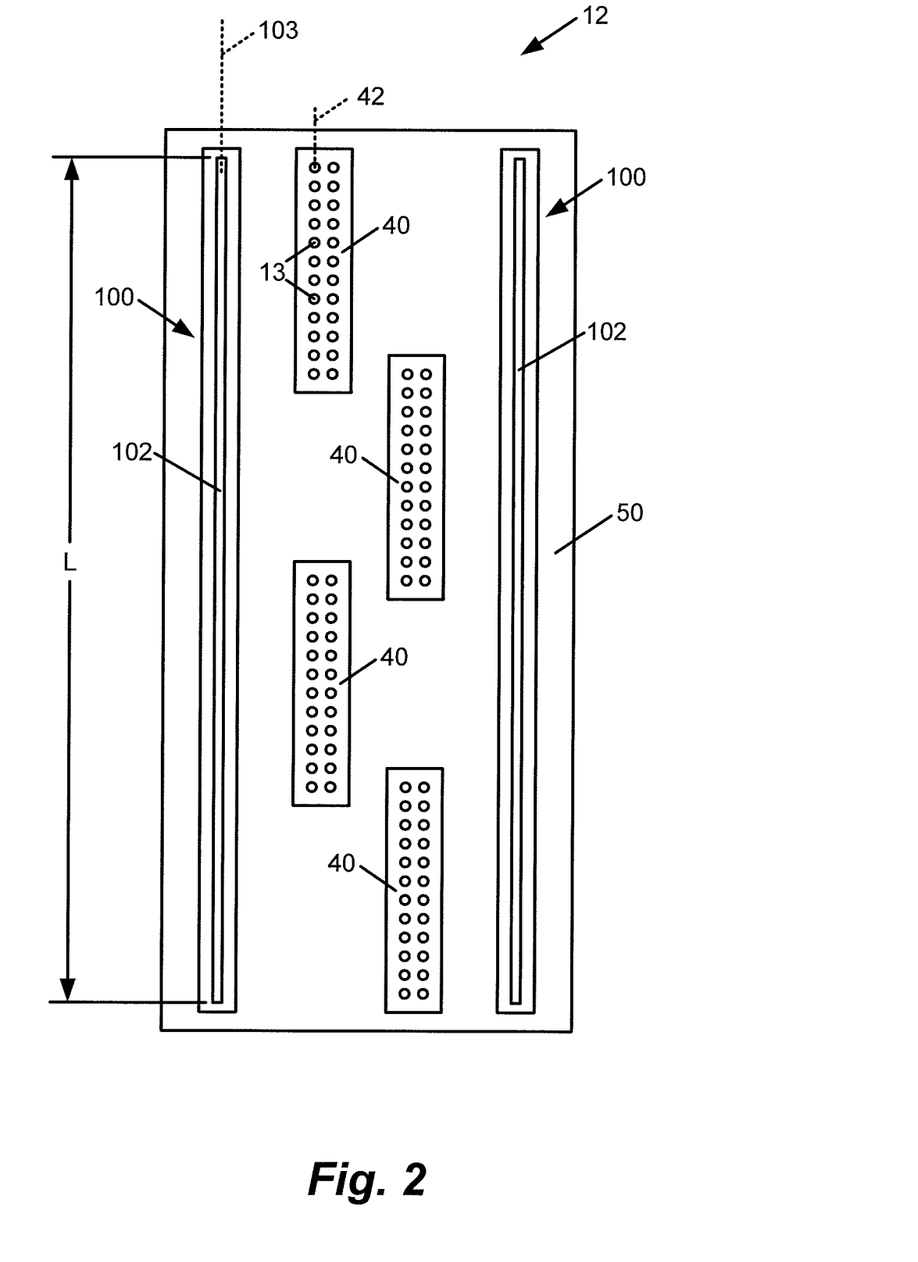
FIG. 2 is a schematic illustration of one example of a printhead assembly of an inkjet printing system.

In one example, as illustrated in FIG. 2, printhead assembly 12 is a wide-array or multi-head printhead assembly and includes a plurality of printheads or printhead dies 40 mounted on a carrier 50, as an example or component of carriage assembly 16. In one implementation, printheads 40 are arranged and aligned in one or more overlapping columns (as oriented in FIG. 2) such that printheads 40 in one column overlap at least one printhead 40 in another column. As such, printhead assembly 12 may span a nominal page width or a width shorter or longer than a nominal page width. For example, printhead assembly 12 may span 8.5 inches of a Letter size print medium or a distance greater than or less than 8.5 inches of the Letter size print medium. While four printheads 40 are illustrated as being mounted on carrier 50, the number of printheads 40 mounted on carrier 50 may vary.

In one implementation, printhead assembly 12, as a wide-array or multi-head printhead assembly including printheads 40, is a non-scanning type printhead assembly such that carrier 50 fixes printhead assembly 12 at a prescribed position relative to print media transport assembly 18 (FIG. 1). With a position of printhead assembly 12 fixed, print media 19 (FIG. 1) is moved or advanced relative to printhead assembly 12 during printing.

Figure 3:
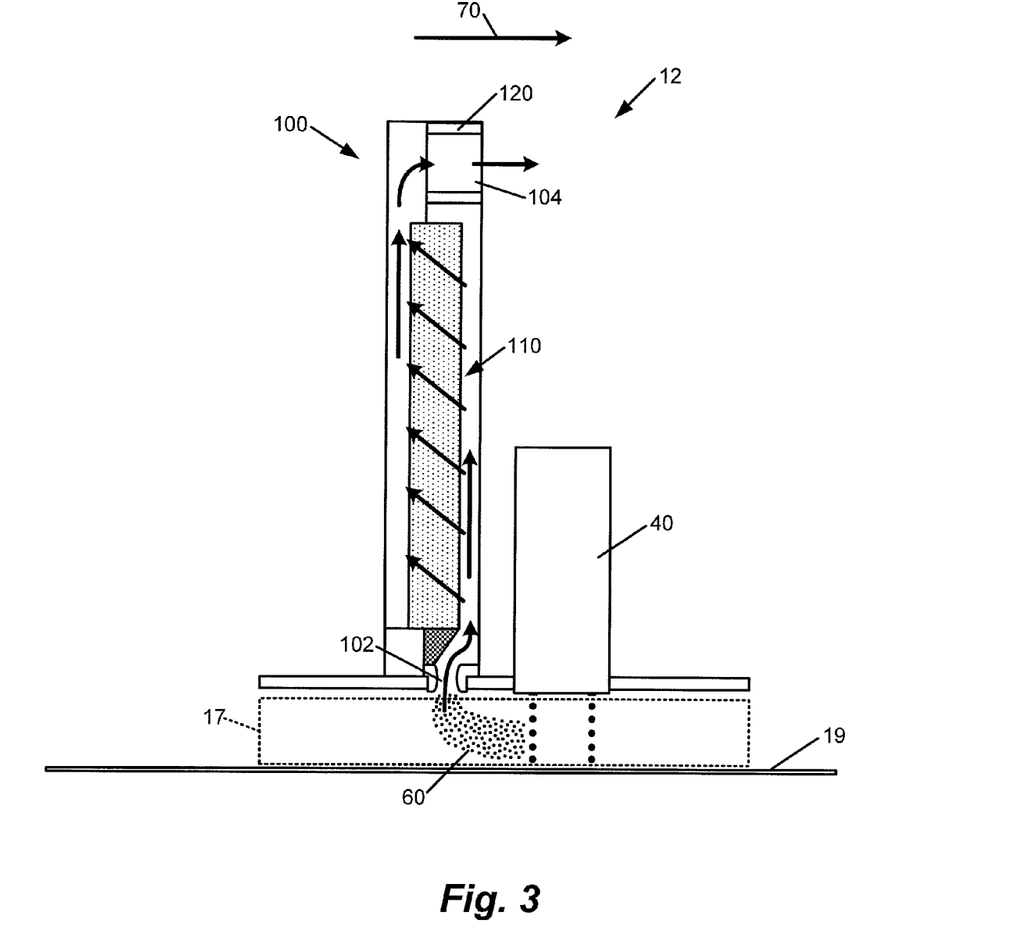
FIG. 3 is a schematic illustration of one example of a printhead assembly of an inkjet printing system including an ink aerosol filtration system.
Figure 4:
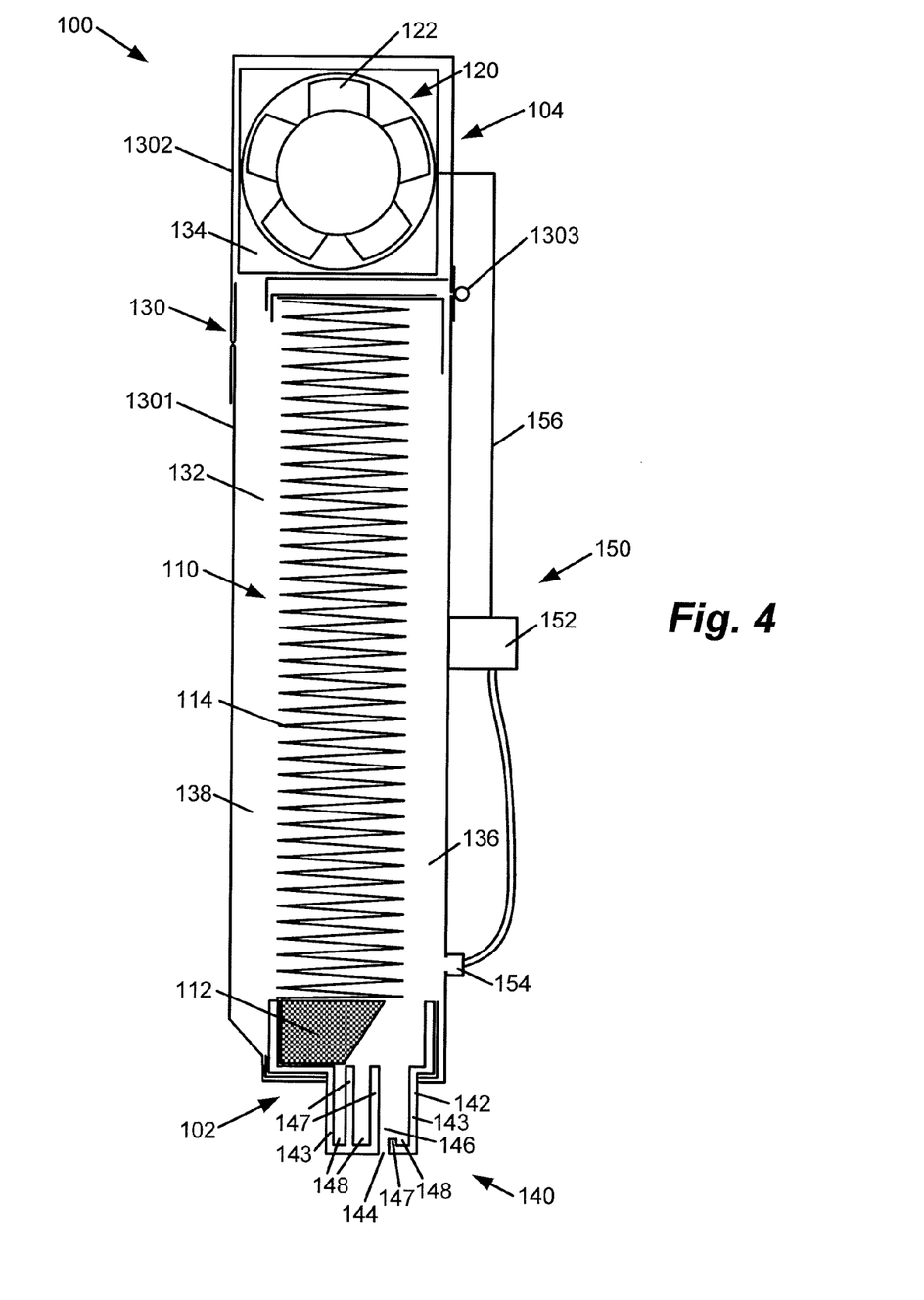
FIG. 4 is a schematic illustration of one example of an ink aerosol filtration system.

As illustrated in FIGS. 2, 3, and 4, printhead assembly 12 includes an ink aerosol collection and filtration system 100 (referred to herein, as "filtration system 100"). In the example illustrated in FIG. 2, filtration system 100 includes an intake or inlet 102 having a length L extended along an axis 103 oriented substantially parallel with a column 42 of ink orifices or nozzles 13 of printheads 40. In addition, in the example illustrated in FIG. 2, two filtration systems 100, one to each side of the array of printheads 40, are provided. As described below, filtration system 100 collects and filters ink aerosol 60 (FIG. 3) generated by printhead assembly 12 during printing to help prevent ink aerosol 60 from spreading throughout printing system 10.

In one example, as schematically illustrated in FIG. 3, filtration system 100 includes inlet 102, an outlet 104, at least one filter member 110, and an airflow source 120. In one example, filtration system 100 is adjacent to and commonly supported with printhead 40 such that inlet 102 communicates with and is open to print zone 17, as defined between printhead assembly 12 and print media 19. Filter member 110 is provided between inlet 102 and outlet 104 such that airflow source 120 is operated to generate a vacuum, partial vacuum or zone of reduced pressure at inlet 102 to draw air, including ink aerosol 60, from print zone 17 in through inlet 102, through filter member 110, and out outlet 104. Accordingly, filter member 110 collects and filters ink aerosol 60, as described below.

In one implementation, filtration system 100 is positioned and operated to a trailing side of printhead 40, with relation to a relative direction of movement between printhead 40 and print media 19 during printing. For example, with relative movement between printhead 40 and print media 19 from left to right, as represented by arrow 70 in FIG. 3, filtration system 100 is positioned and operated to the left of printhead 40. As such, filtration system 100 operates in the trailing wake of printhead 40 to capture and collect ink aerosol 60.

As illustrated in the example of FIG. 4, filtration system 100 also includes a housing 130, a nozzle assembly 140, and a pressure monitoring assembly 150. Housing 130 includes inlet 102 and outlet 104, and provides a filtration chamber 132 and a plenum chamber 134 such that filtration chamber 132 communicates with inlet 102 and plenum chamber 134 communicates with filtration chamber 132 and outlet 104. As such, housing 130 supports filter member 110 within filter chamber 132, and supports airflow source 120 to communicate with plenum chamber 134.

In one example, nozzle assembly 140 is supported by housing 130 at inlet 102 and includes a nozzle body 142, a nozzle opening 144, and a nozzle passage 146. Nozzle body 142 is communicated with filtration chamber 132 and nozzle opening 144 is formed in nozzle body 142 such that nozzle passage 146 is communicated with nozzle opening 144 and extends through nozzle body 142 to communicate with filtration chamber 132. In one implementation, nozzle passage 146 is defined by one or more partitions 147 formed within nozzle body 142.

In one example, nozzle body 142 includes one or more collection troughs 148 adjacent nozzle opening 144 and/or nozzle passage 146 to collect particles or fluid (i.e., liquid) of ink aerosol 60, as described below. In one implementation, collection troughs 148 are formed or defined by one or more sidewalls 143 of nozzle body 142 and/or one or more partitions 147 formed within nozzle body 142.

In one example, as illustrated in the example of FIG. 4, filter member 110 includes a first filter member 112 and a second filter member 114. First filter member 112 is provided within filtration chamber 132 of housing 130 adjacent inlet 102, and second filter member 114 is provided within filtration chamber 132 of housing 130 between inlet 102 and plenum chamber 134 of housing 130 including, more specifically, between first filter member 112 and plenum chamber 134. In one implementation, second filter member 114 is positioned in filtration chamber 132 so as to define an inlet side 136 of filtration chamber 132 and an outlet side 138 of filtration chamber 132. In addition, second filter member 114 extends along a length of filtration chamber 132 between inlet 102 and plenum chamber 134.

As such, first filter member 112 and second filter member 114 filter ink aerosol 60 (FIG. 3) drawn into filtration chamber 132 through inlet 102. More specifically, in one implementation, first filter number 112 is an absorbent filter and filters larger particles and liquid from ink aerosol 60 such that liquid from ink aerosol 60 is collected in collection trough 148. As such, second filter member 114 filters remaining, smaller particles from ink aerosol 60 as ink aerosol 60 passes across or through second filter number 114 from inlet side 136 to outlet side 138 of filtration chamber 132.

In one example, as illustrated in the example of FIG. 4, housing 130 of filtration system 100 includes a base portion 1301 including inlet 102, and a top portion 1302 including outlet 104. As such, filtration chamber 132 is defined within base portion 1301 of housing 130 and plenum chamber 134 is defined within top portion 1302 of housing 130 such that filter member 110, including, for example, first filter member 112 and second filter member 114, is provided within base portion 1301 and airflow source 120 is supported by top portion 1302.

In one implementation, top portion 1302 is coupled to base portion 1301 by, for example, a hinge 1303 such that top portion 1302 may be opened to provide access to base portion 1301 including, more specifically, an interior of filtration chamber 132 of housing 130. As such, filter member 110 including, for example, first filter member 112 and second filter member 114, may be removed from filtration chamber 132 and cleaned or replaced. In one example, filter member 110 including, for example, first filter member 112 and second filter member 114, and nozzle assembly 140 are integrated such that filter member 110 and nozzle assembly 140 together may be removed from housing 130 and cleaned or replaced.

In one example, airflow source 120 includes at least one fan 122 supported by housing 130 and communicated with plenum chamber 134. As such, fan 122 is operated to create a vacuum (i.e., reduced pressure) within housing 130 and at inlet 102 to draw air, including ink aerosol 60, in through inlet 102, through filter member 110, and out outlet 104. In one implementation, airflow source 120 includes two fans 122 (only one of which is shown) provided at opposite ends of plenum chamber 134 to generate airflow through filtration system 100.

As schematically illustrated in the example of FIG. 4, pressure monitoring assembly 150 includes a pressure sensor 152 and a pressure port 154 operatively coupled with pressure sensor 152. In one example, pressure port 154 is communicated with inlet side 136 of filtration chamber 132 to measure pressure at inlet side 136 of filtration chamber 132.

As schematically illustrated in the example of FIG. 4, pressure sensor 152 is communicatively coupled with airflow source 120 via a communication line 156 to provide feedback or input to airflow source 120 for control of airflow source 120 to control pressure at inlet 102 and inlet side 136 of filtration chamber 132. As such, closed-loop control of airflow source 120 is provided. By controlling pressure at inlet side 136, flow through inlet 102 including, more specifically, flow through nozzle assembly 140 may be controlled. In one example, airflow velocity through inlet 102 is measured and controlled. As such, in one implementation, an airspeed sensor may be used to measure airflow velocity through inlet 102.

In one implementation, airflow source 120 is controlled to maintain substantially constant pressure at inlet side 136 of filtration chamber 132 including, more specifically, substantially constant pressure across or through nozzle assembly 140. By maintaining substantially constant pressure at inlet side 136, substantially constant flow (e.g., airflow velocity) through inlet 102 including, more specifically, substantially constant flow through nozzle assembly 140 may be maintained. With substantially constant flow through inlet 102, life of filter member 110 may be extended independently of filter saturation such that performance of system 100 may be maintained. As such, usable filter life may be maximized, and a smaller filter may be used. In addition, with substantially constant flow through inlet 102, disturbance of airflow close to printhead 40 (FIG. 3) may be controlled such that possible drop placement error (DPE) effects, which can be caused by disturbance of airflow around the printhead, may be minimized or avoided.

In one example, airflow source 120 is controlled with pulse width modulation (PWM). As such, airflow source 120 may be specifically controlled to control pressure within filtration chamber 132 including, more specifically, at inlet 102 as measured at pressure port 154. In one implementation, PWM of airflow source 120 is regulated to adjust a pressure drop across filter member 110 and provide a desired pressure at inlet 102. For example, the higher the pressure drop across filter member 110 (e.g., dirty or clogged filter), the higher the PWM to maintain the desired pressure at inlet 102.

With PWM control of airflow source 120, filter monitoring is also provided. More specifically, pressure drop across filter member 110 can be monitored through the relationship of a measured pressure as compared to a pressure set point for an applied PWM. For example, a reduced or lowering PWM for airflow source 120, in relation to an increased pressure drop across filter member 110, may indicate that filter member 110 is dirty or clogged and may need to be replaced or cleaned (i.e., filter health), or may indicate another problem with the system (e.g., no filter). By providing feedback control of pressure assembly 150 to airflow source 120, life of filter member 110 may be extended independently of filter saturation.

Figure 5:
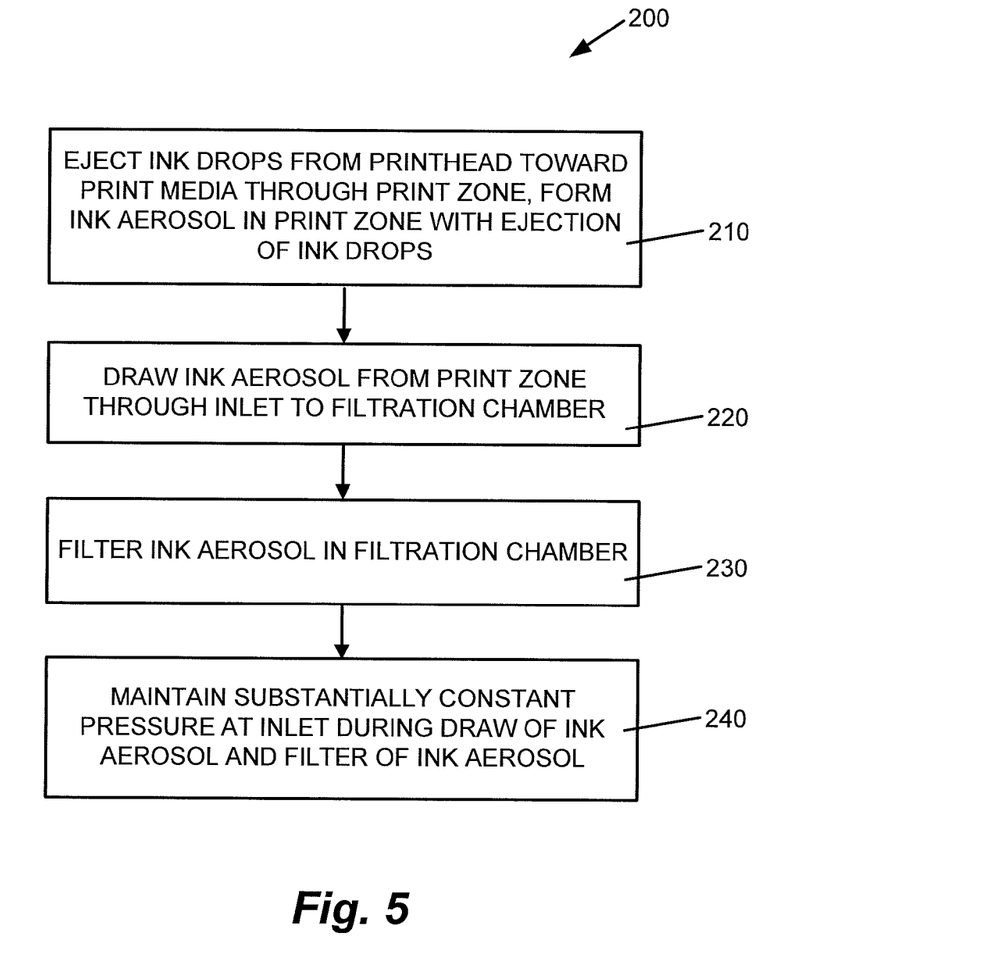
FIG. 5 is a flow diagram illustrating one example of a method of printing with an inkjet printing system including an ink aerosol filtration system.

FIG. 5 is a flow diagram illustrating one example of a method 200 of printing with an inkjet printing system including an ink aerosol filtration system, such as ink aerosol collection and filtration system 100.

With method 200, at 210, ink drops are ejected from a printhead, such as printhead 40, toward a print media, such as print media 19, and through a print zone, such as print zone 17, as schematically illustrated in the example of FIG. 3. In one example, ink aerosol, such as ink aerosol 60, is formed in the print zone with the ejection of the ink drops, as schematically illustrated in the example of FIG. 3.

At 220, the ink aerosol, such as ink aerosol 60, is drawn from the print zone through an inlet, such as inlet 102, and into a filtration chamber, such as filtration chamber 132, as schematically illustrated in the example of FIG. 3. In one implementation, the ink aerosol is drawn from the print zone through a nozzle assembly, such as nozzle assembly 140, as schematically illustrated in the example of FIG. 4. More specifically, the ink aerosol is drawn though a nozzle opening of a nozzle body, such as nozzle opening 144 of nozzle body 142, and into the filtration chamber through a nozzle passage of the nozzle body, such as nozzle passage 146 of nozzle body 142. In one example, a portion of the ink aerosol is collected in a collection trough formed in the nozzle body, such as collection trough 148.

At 230, the ink aerosol, such as ink aerosol 60, is filtered in the filtration chamber. In one implementation, the ink aerosol is filtered with a filter member, such as filter member 110, as schematically illustrated in the examples of FIGS. 3 and 4. More specifically, in one example, the ink aerosol is filtered with a first filter member, such as filter member 112, provided adjacent the inlet to the filtration chamber, and filtered with a second filter member, such as filter member 114, provided between an inlet side of the filtration chamber, such as inlet side 136 of filtration chamber 132, and an outlet side of the filtration chamber, such as outlet side 138 of filtration chamber 132.

At 240, substantially constant pressure is maintained at the inlet to the filtration chamber during the drawing of the ink aerosol (at 220) and the filtering of the ink aerosol (at 230). In one implementation, a pressure at the inlet side of the filtration chamber is monitored, for example, by a pressure assembly 150, as schematically illustrated in the example of FIG. 4, such that an airflow source communicated with the filtration chamber, such as airflow source 120, as schematically illustrated in the example of FIG. 4, is controlled based on the monitored pressure at the inlet side of the filtration chamber to maintain substantially constant pressure at the inlet to the filtration chamber.

With ink aerosol collection and filtration system 100, ink aerosol is captured close to the point of generation, namely the printhead. More specifically, with system 100, ink aerosol is collected and filtered to keep the ink aerosol from propagating throughout the printing system.

In addition, with ink aerosol collection and filtration system 100, ink aerosol is collected with controlled airflow. More specifically, nozzle restriction of nozzle assembly 140 provides for collection of ink aerosol within a more restricted area with less airflow thereby minimizing disturbance of airflow close to the printhead and reducing possible drop placement error (DPE) effects.

Furthermore, with ink aerosol collection and filtration system 100, a set point for PWM of airflow source 120 provides for closed-loop control of pressure at inlet 102 independent of pressure drop across filter member 110. Accordingly, a pressure drop through nozzle assembly 140 may be controlled to provide a target pressure with a prescribed velocity at inlet 102. More specifically, vacuum pressure within system 100 may be controlled to maintain a substantially constant pressure at inlet 102, such that substantially constant airflow into system 100 is maintained.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. An ink aerosol filtration system, comprising:
   an inlet;
   a filtration chamber communicated with the inlet and including at least one filter member; and
   an airflow source communicated with the filtration chamber to generate flow into the inlet, through the filtration chamber and through the at least one filter member,
   wherein the airflow source is controlled to maintain substantially constant pressure at the inlet,
   wherein the at least one filter member comprises a first filter member adjacent the inlet, and a second filter member between an inlet side and an outlet side of the filtration chamber.

2. The system of claim 1, wherein the airflow source generates reduced pressure at the inlet.

3. The system of claim 1, further comprising:
   a pressure sensor communicated with an inlet side of the filtration chamber to measure pressure at the inlet side of the filtration chamber and provide feedback for control of the airflow source to maintain the substantially constant pressure at the inlet.

4. The system of claim 1, further comprising:
   a nozzle assembly at the inlet, the nozzle assembly including:
      a nozzle body communicated with the filtration chamber,
      a nozzle opening formed in the nozzle body,
      a nozzle passage communicated with the nozzle opening and extended through the nozzle body, and
      a collection trough formed in the nozzle body.

5. The system of claim 1, further comprising:
   a plenum chamber communicated with the filtration chamber; and
   an outlet communicated with the plenum chamber,
   wherein the airflow source is communicated with the plenum chamber to generate the flow into the inlet, through the filtration chamber and through the at least one filter member, through the plenum chamber, and out the outlet.

6. A printing system, comprising:
   a printhead to eject ink drops through a print zone toward a print media; and
   a filtration system to filter ink aerosol generated with the ejected ink drops, the filtration system including:
      a filtration chamber communicated with an inlet open to the print zone,
      a nozzle assembly at the inlet, the nozzle assembly including: a nozzle body communicated with the filtration chamber, a nozzle opening formed in the nozzle body, a nozzle passage communicated with the nozzle opening and extended through the nozzle body, and a collection trough formed in the nozzle body,
      at least one filter member within the filtration chamber, and
      an airflow source communicated with the filtration chamber to draw the ink aerosol into the inlet, through the filtration chamber and through the at least one filter member,
      wherein the airflow source is controlled to maintain substantially constant pressure at the inlet.

7. The printing system of claim 6, wherein the filtration system further includes:
   a pressure sensor communicated with an inlet side of the filtration chamber to measure pressure at the inlet side of the filtration chamber and provide feedback for control of the airflow source to maintain the substantially constant pressure at the inlet.

8. The printing system of claim 6, wherein the at least one filter member of the filtration system comprises a first filter member provided adjacent the inlet, and a second filter member provided between an inlet side and an outlet side of the filtration chamber.

9. The printing system of claim 6, wherein the printhead includes at least one column of orifices through which ink drops are ejected, and wherein a length of the inlet of the filtration system is oriented and extended substantially parallel with the at least one column of orifices.

10. The printing system of claim 6, wherein the airflow source generates reduced pressure at the inlet.

11. The printing system of claim 6, further comprising:
    a plenum chamber communicated with the filtration chamber; and
    an outlet communicated with the plenum chamber,
    wherein the airflow source is communicated with the plenum chamber to generate the flow into the inlet, through the filtration chamber and through the at least one filter member, through the plenum chamber, and out the outlet.

12. A method of printing, comprising:
    ejecting ink drops from a printhead toward a print media through a print zone, including forming ink aerosol in the print zone with the ejecting of the ink drops;
    drawing the ink aerosol from the print zone through an inlet to a filtration chamber;
    filtering the ink aerosol in the filtration chamber; and
    during the drawing the ink aerosol and the filtering the ink aerosol, maintaining substantially constant pressure at the inlet,
    wherein maintaining the substantially constant pressure at the inlet includes monitoring a pressure at an inlet side of the filtration chamber and controlling an airflow source communicated with the filtration chamber based on the pressure at the inlet side of the filtration chamber.

13. The method of claim 12, wherein drawing the ink aerosol includes drawing the ink aerosol through a nozzle opening of a nozzle body and into the filtration chamber through a nozzle passage of the nozzle body, and collecting a portion of the ink aerosol in a collection trough formed in the nozzle body.

14. The method of claim 12, wherein filtering the ink aerosol includes filtering the ink aerosol with a first filter member provided adjacent the inlet to the filtration chamber and filtering the ink aerosol with a second filter member provided between an inlet side and an outlet side of the filtration chamber.

* * * * *